(12) United States Patent
Mizutani

(10) Patent No.: US 8,610,825 B2
(45) Date of Patent: Dec. 17, 2013

(54) CONTENT REPRODUCING DEVICE, CONTENT REPRODUCING METHOD, AND COMPUTER READABLE MEDIUM

(75) Inventor: Fumitoshi Mizutani, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 59 days.

(21) Appl. No.: 13/197,508

(22) Filed: Aug. 3, 2011

(65) Prior Publication Data

US 2012/0163765 A1 Jun. 28, 2012

(30) Foreign Application Priority Data

Dec. 24, 2010 (JP) ................. 2010-288099

(51) Int. Cl.
*H04N 7/01* (2006.01)
*H04N 11/20* (2006.01)
*H04N 5/46* (2006.01)
*H04N 5/765* (2006.01)
*H04N 9/80* (2006.01)

(52) U.S. Cl.
USPC ........... 348/445; 348/441; 348/556; 386/232; 386/239; 386/240; 386/248

(58) Field of Classification Search
USPC .......... 386/232, 239, 240, 248; 348/445, 441, 348/556
See application file for complete search history.

(56) References Cited

U.S. PATENT DOCUMENTS 7,506,261 B2 * 3/2009 Satou et al. .......... 715/740

FOREIGN PATENT DOCUMENTS

JP 3912739 10/2003

* cited by examiner

*Primary Examiner* — Daquan Zhao
(74) *Attorney, Agent, or Firm* — Blakely, Sokoloff, Taylor & Zafman LLP

(57) ABSTRACT

An acquisition unit reads content including at least, (a) an image signal of an image frame defined by first and second directions, (b) first and second sizes showing sizes in the first and second directions, and (c) an aspect ratio of the second direction to the first direction. An inspection unit inspects whether the content includes a display area specification. A determination unit calculates a third size by multiplying the first size by the aspect ratio and determines a display area of the image frame based on an entire range in the first direction and a range of the third size from a predetermined position in the image frame in the second direction, when the display area specification is not included in the content. A controller performs control so that the display area of the image frame is displayed and a part other than the display area is not displayed.

17 Claims, 6 Drawing Sheets

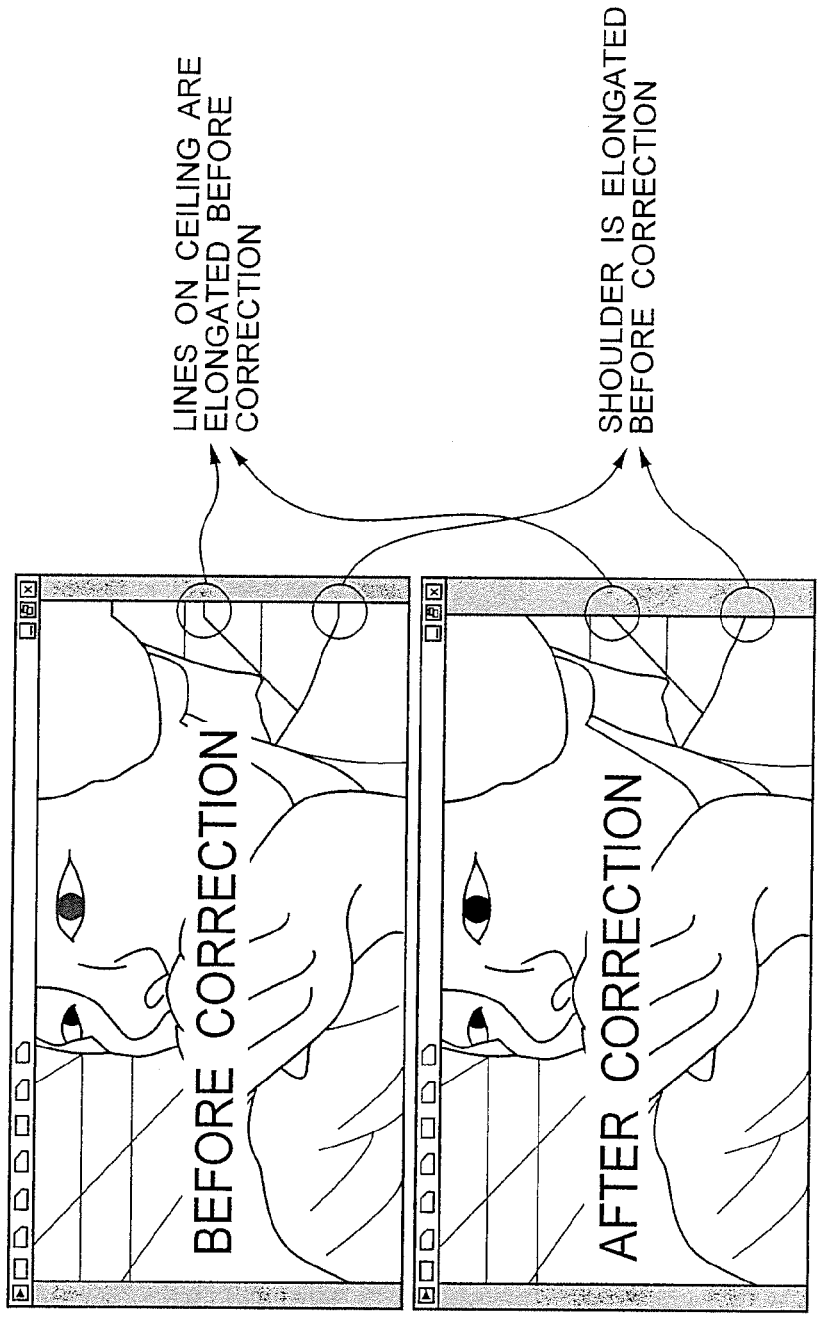

CONTENT REPRODUCING DEVICE, CONTENT REPRODUCING METHOD, AND COMPUTER READABLE MEDIUM

CROSS REFERENCE TO RELATED APPLICATIONS

This application is based upon and claims the benefit of priority from the prior Japanese Patent Application No. 2010-288099, filed on Dec. 24, 2010, the entire contents of which are incorporated herein by reference.

FIELD

The embodiment of the present invention relates to a content reproducing device, a content reproducing method, and a computer readable medium.

BACKGROUND

In recent years, the number of videos distributed through a network such as the Internet has been increasing. As it has become freer and easier to distribute content, noncompliant content has been more distributed.

For example, when the frame size of content is different from its actual display size, that is, when the image to be actually displayed in the frame is arranged in a partial area of the frame, a display area specification field should be set in distribution content to specify the area.

However, content lacking such a display area specification is distributed under current circumstances.

When the display area specification field is lacking, the frame is entirely displayed by a display device, which means that an unrelated image is also displayed in a part other than the display area in the frame. Such a display is unsightly to users.

BRIEF DESCRIPTION OF THE DRAWINGS

FIGS. 6A and 6B are diagrams explaining the effect of the embodiment.

DETAILED DESCRIPTION

Figure 1:
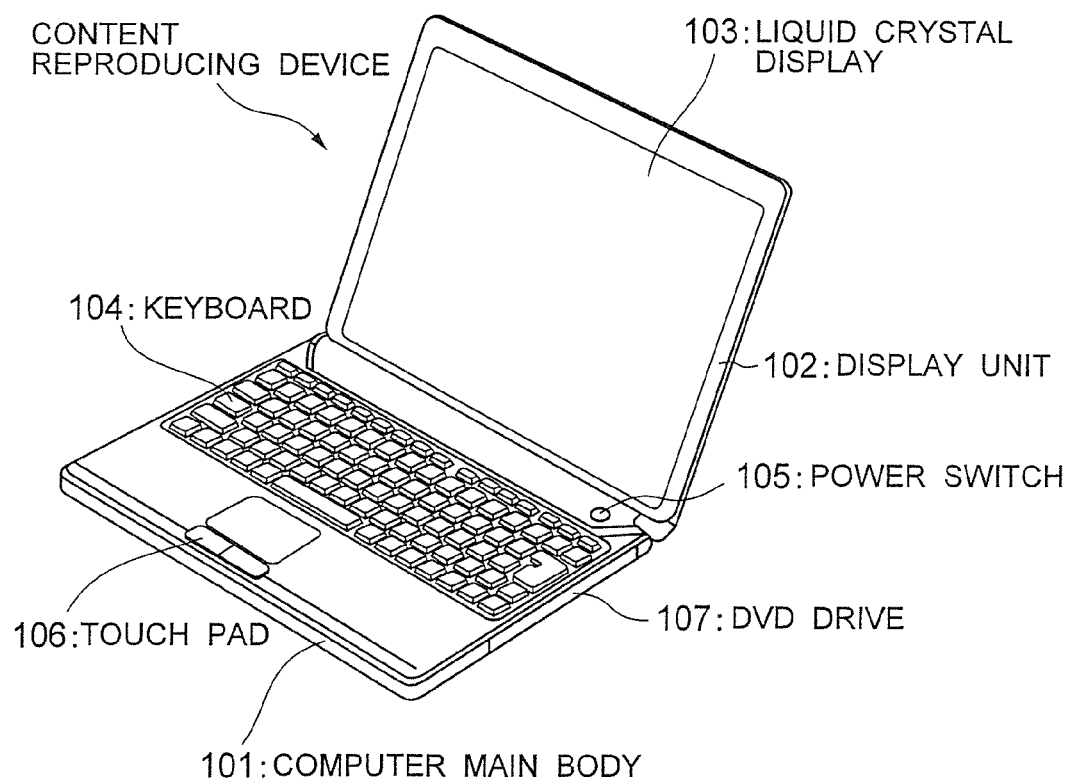
FIG. 1 is a perspective diagram of a content reproducing device according to an embodiment.

According to one aspect of embodiments, there is provided a content reproducing device including: a content acquisition unit, an inspection unit, a display area determination unit and a reproduction controller.

The content acquisition unit reads content from a recording medium, the content including at least, (a) an image signal of an image frame defined by a first direction and a second direction perpendicular to the first direction, (b) a first size and a second size respectively showing sizes in the first direction and the second direction of the image frame, and (c) an aspect ratio of the second direction to the first direction.

The inspection unit inspects whether the content includes a display area specification for the image frame.

The display area determination unit calculates a third size by multiplying the first size by the aspect ratio and determines a display area of the image frame based on an entire range in the first direction and a range of the third size from a predetermined position in the image frame in the second direction, when the display area specification is not included in the content.

The reproduction controller performs control so that the display area of the image frame is displayed and a part other than the display area in the image frame is not displayed.

Hereinafter, embodiments will be explained in detail referring to the drawings.

FIG. 1 is a perspective diagram of a content reproducing device according to an embodiment of the present invention.

This content reproducing device is a notebook type PC (personal computer) having a computer main body 101 and a display unit 102. A liquid crystal display 103 is incorporated into the display unit 102.

The content reproducing device realized as a notebook PC in this example may be a normal desktop type PC or a handheld device, or may be incorporated into a DVD reproducing device.

The display unit 102 is arranged to open and close the computer main body 101. The computer main body 101 is a box type housing having, on its top surface, a keyboard 104 and a touch pad 106 shown as examples of input units and a power switch 105 for turning on/off the power of this device.

Further, the computer main body 101 has, on its side surface, a DVD drive 107. The DVD drive 107 can record and reproduce on a recording medium such as CD, DVD, etc.

Figure 2:
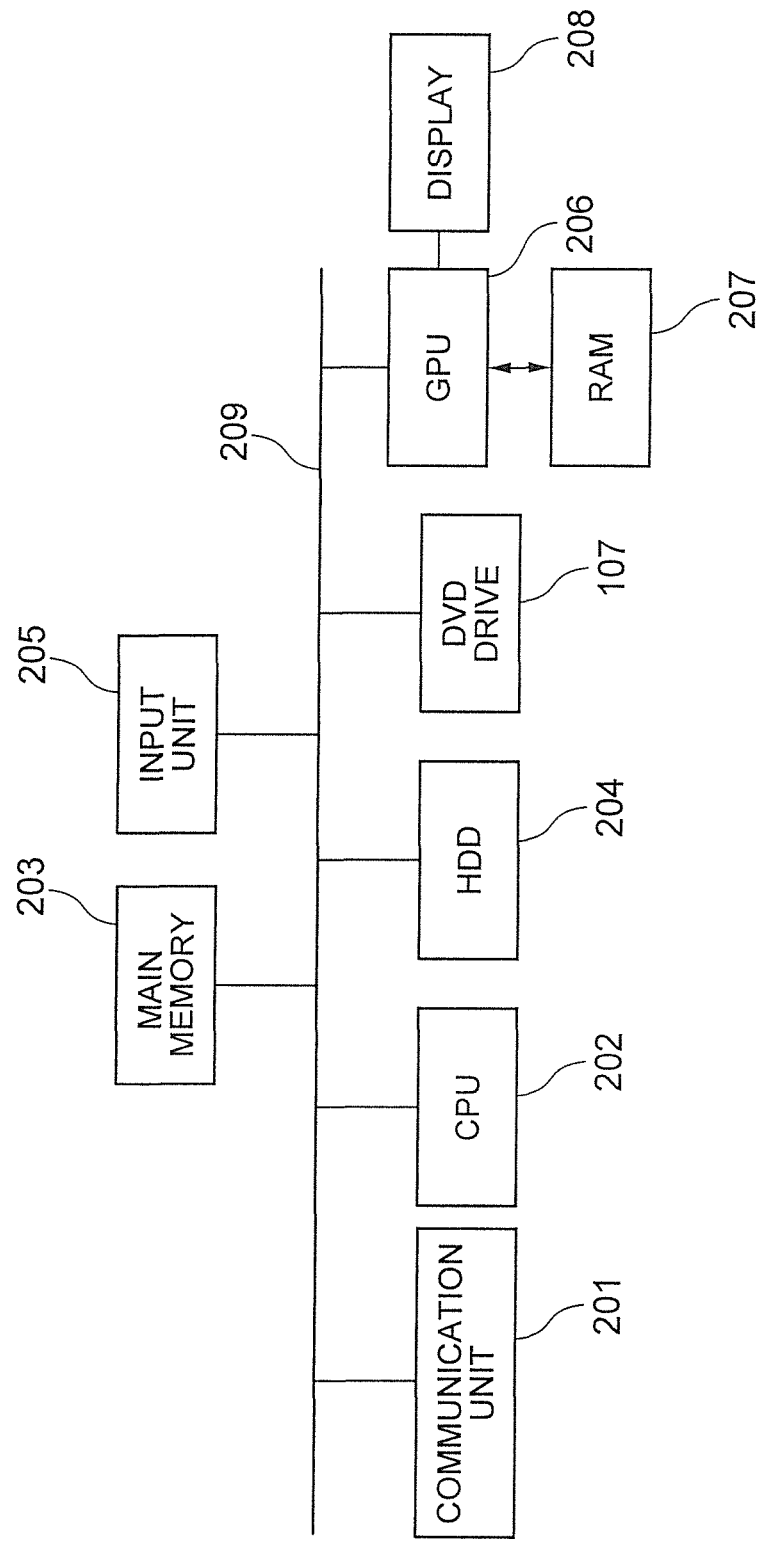
FIG. 2 is a block diagram schematically showing a hardware structure of the content reproducing device according to the embodiment.

FIG. 2 is a block diagram schematically showing a hardware structure of the content reproducing device according to the embodiment of the present invention.

This content reproducing device includes: a communication unit 201; a CPU 202; a main memory 203; a hard disk drive (HDD) 204; an input unit 205; a graphics processing unit (GPU) 206; a video memory (VRAM) 207; a display 208; the DVD drive 107; and a bus 209. The elements 201 to 208 are connected to one another through the bus 209.

In this configuration, a single bus is shown for simplification, but a plurality of buses may be arranged with a controller for connecting the buses. The display 208 corresponds to the display unit 102 and liquid crystal display 103 in FIG. 1. The input unit 205 corresponds to the keyboard 104 and touch pad 106 in FIG. 1.

The communication unit 201 is a wireless communication device for establishing wire communication or wireless communication. The wireless communication may be wireless LAN communication based on IEEE 802.11 standard, or ground communication using a 3G mobile communication system etc. The wire communication may be a wired LAN based on IEEE 802.3 standard, or serial bus communication based on IEEE 1394 standard. Further, the communication unit 201 may be a TV tuner for receiving broadcast program data broadcasted by a television broadcast signal.

The HDD 204 stores various applications such as operating system (OS), video reproducing software (content reproducing application program), etc. The functions characterized in the present embodiment are incorporated into this video reproducing software as a computer program.

The video reproducing software can reproduce various content such as WMV (Windows Media Video)-based video content, DVD-video-based video content, etc., for example.

The main memory 203 is used as a temporary working memory of the CPU 202. For example, the main memory 203 is used to load and expand a program in the HDD 204 and to store working data generated in the operation of the program.

The CPU 202 is a processor for controlling the operation of this device. The CPU 202 loads the operating system (OS) and application in the HDD 204 into the main memory 203 and executes them. Various application programs including a content reproducing application program may be stored in a recording medium (non-transitory computer readable medium) such as CD-ROM and executed by being downloaded from the recording medium.

The GPU 206 is a display controller for controlling the display 208 of this device. The display signal generated by the GPU 206 is transmitted to the display 208. The GPU 206 uses the VRAM 207 as a display memory of the display 208.

Figure 3:
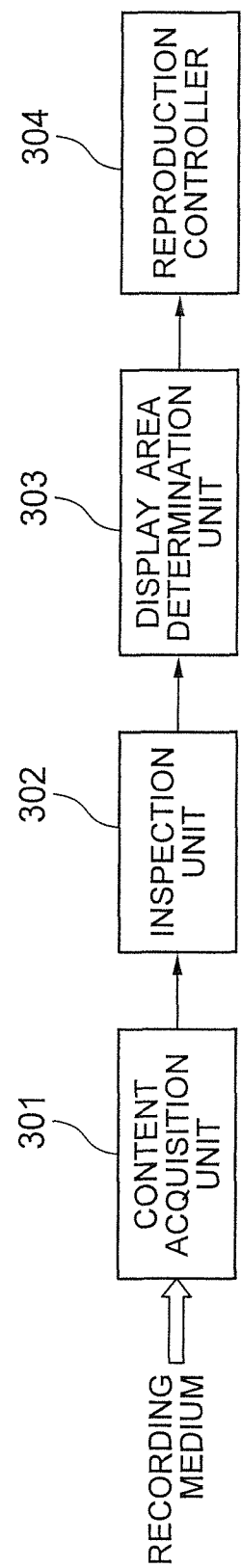
FIG. 3 is a functional block diagram of a content reproducing application according to the embodiment.
Figure 4:
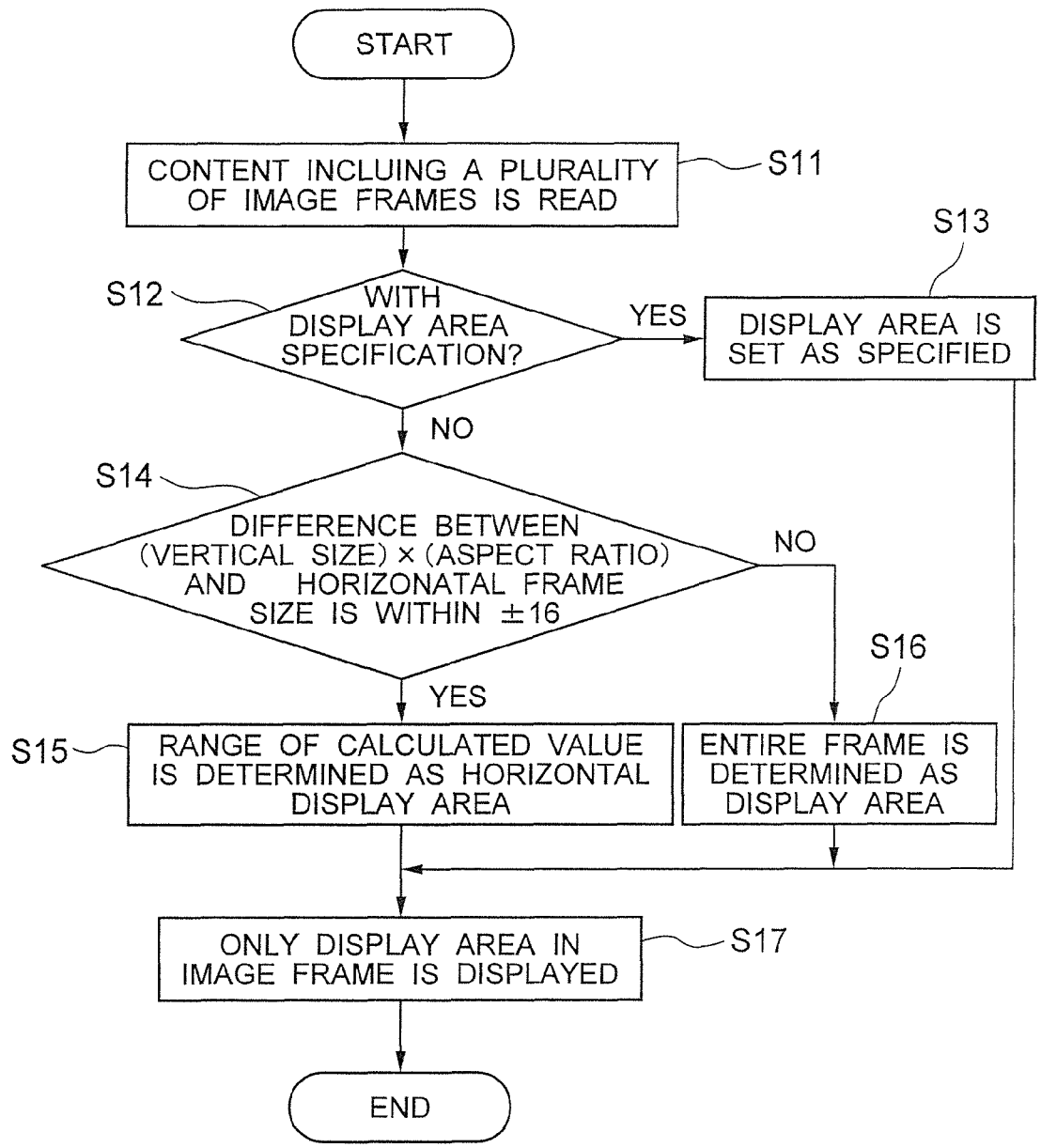
FIG. 4 is a flow chart showing an example of the operation flow when reproducing content.

FIG. 3 is a functional block diagram of a content reproducing application for the embodiment of the present invention. FIG. 4 is a flow chart showing an example of the operation flow when reproducing content.

Content is reproduced by the content reproducing application loaded into the main memory 203 of this device. By executing the content reproducing application, the CPU 202 functions as a content acquisition unit 301, an inspection unit 302, a display area determination unit 303, and a reproduction controller 304, as shown in FIG. 3.

The content acquisition unit 301 reads, from a recording medium, content including image signal, audio signal, setting information, etc. (Step S11). The setting information includes various information concerning the vertical size and horizontal size, aspect ratio, encoding method, format information etc. of the frame. The image signal is a signal formed of a plurality of image frames. The content decodes the read image signal and audio signal. The vertical direction of the frame corresponds to a first direction or a second direction, and the horizontal direction corresponds to the second direction or the first direction. The first direction and the second direction are perpendicular to each other. Further, the vertical size of the frame corresponds to a first size or a second size, and the horizontal size corresponds to the second size or the first size.

Here, the content may be received in real time from an external server or a TV station through wire or wireless communication, or may be read from a recording medium such as DVD-ROM, hard disk, and the main memory 203.

The inspection unit 302 inspects whether a display area specification for the frame is set in the content (Step S12). Concretely, the inspection unit 302 inspects whether the setting information acquired by the content acquisition unit 301 includes a display area specification.

When the display area specification is set, the display area determination unit 303 determines the display area of the frame directly as specified by the display area specification (Step S13).

On the other hand, when the display area specification is not set, the display area determination unit 303 determines the display area as follows.

First, an effective size (third size) is calculated by multiplying the vertical size of the frame by the aspect ratio included in the setting information (Step S14). The aspect ratio in this case is a ratio of the horizontal size to the vertical size, which can be expressed as horizontal size/vertical size.

For example, when the frame has a vertical size of 480, a horizontal size of 864, and an aspect ratio of 16/9 (namely 16:9), the third size is obtained as follows: 480×16/9=853.333.

Then, whether the difference between the third size and the horizontal frame size is a predetermined value or smaller is inspected (Step S14). In this example, the predetermined value is 16, and thus whether the difference between the third size and the horizontal frame size (864) is within a range of ±16 is inspected.

If within a range of ±16 (YES at Step S14), a range of the third size from the leftmost position of the frame is determined as a display range in the horizontal direction (Step S15). Then, an area settled by the determined display range in the horizontal direction and the entire range in the vertical direction is determined as the display area (Step S15). In the frame, the area other than the determined display area is judged to be unrelated data (padding data) added for adjusting the size. For example, depending on the created content, the padding data is added to make the size (number of pixels) be a multiple of 16.

In this example, the difference in size between 864 and 853.333 is smaller than 16, and thus the requirement of Step S14 is satisfied and the display area is determined by Step S15. For example, in one frame, an area enclosed by a range of 852 (852 obtained by rounding 853.333 may be replaced by 853, 854, etc.) from the leftmost position in the horizontal direction and the entire range (480) in the vertical direction is determined as the display area.

Here, the range of the third size is determined using the leftmost position of the image frame as its starting point, which is shown as merely an example. It is also possible to determine the range of the third size by using the rightmost position of the image frame as the starting point. Further, the range of the third size can be set so that both of the end parts of the frame are equally left.

If not within a range of ±16 (NO at Step S14), the entire frame is determined as the display area (Step S16). That is, such a frame is not regarded as a display adjustment target in the present embodiment. In other words, the present application focuses on finely displaying a frame having a specific resolution.

The reproduction controller 304 generates an image signal so that the part corresponding to the display area in the frame is displayed on the screen, and so that the part other than the display area is not displayed. For example, the image signal is generated only for the part corresponding to the display area. Further, it is also possible that the value of the image signal is used for the display area while an image signal having the value of a black image is generated for the part other than the display area. Furthermore, the image signal may be generated so that the window is made smaller to hide the part other than the display area.

The reproduction controller 304 transmits the generated image signal to the GPU 206, and the GPU 206 displays the image signal on the display 208.

Figure 5:
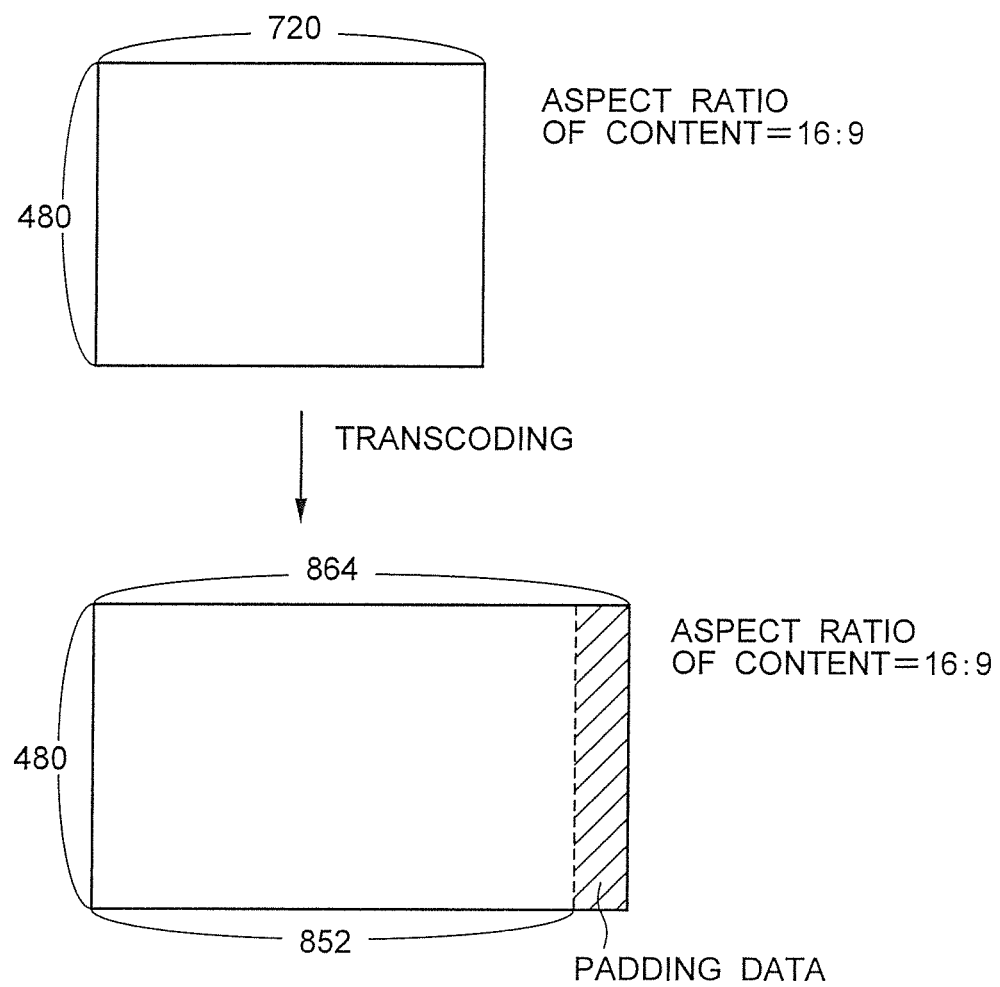
FIG. 5 is diagram explaining how padding data is added when transcoding content.

Here, processes performed in Step S14 and Step S15 will be explained in detail using FIG. 5.

For example, the image signal to be inputted into this device is an image signal encoded by a video codec having a WMV format (vertical size: 480, horizontal size: 864). Assume that this image signal is created by transcoding a DVD-Video signal having a size of 720×480 and an aspect ratio of 16/9. Note that when performing transcoding, parameters concerning the size of frame to be created and a pixel aspect ratio can be freely set. The parameter concerning the pixel aspect ratio is specified as 1:1. Note that since the pixel aspect ratio of the DVD image signal is not 1:1, the value of ratio on the number of pixels (720/480) does not directly lead to the value of the aspect ratio (16/9).

When performing transcoding, since the frame to be created should have a vertical size of 480 and an aspect ratio of 16/9, its horizontal size is calculated as 853.333 (approximated to 852 in this case). However, since the number of pixels should be a multiple of 16 in each of the vertical and horizontal directions, padding data (hatched part in FIG. 5) is added and the horizontal size is set to 864.

When the frame added with the padding data is displayed as it is, it becomes unsightly since the padding data is displayed as an unrelated image. Accordingly, in order to finely display such a frame, display area setting processes are performed in Steps S14 and S15.

As shown in the drawing, the area from 853.333 (approximated to 852 in this case) to 864 in the horizontal direction of the frame is the padding data. This padding data is detected in Step S14 based on the judgement that the difference between the value obtained by multiplying the vertical size by the aspect ratio and the horizontal frame size is 16 or smaller.

Then, in Step S15, the area other than the padding data in the entire frame is set as the display area. By displaying only the image signal of this display area in the frame without displaying the padding data, a fine image can be displayed without unrelated images.

Here, the above difference is beyond 16 when content having a frame size of 720×480 and an aspect ratio of 16/9 is inputted, for example. In such a case, the difference calculated in Step S14 is not within a range of ±16, and thus the content is not regarded as a display adjustment target in the present embodiment. In the case of such a frame, the entire frame of the content is set as the display area in Step S16.

FIG. 6 is diagram explaining the effect of the present embodiment.

FIG. 6A shows a conventional display picture, and FIG. 6B shows a display picture when setting the display area by Step S15 in the present embodiment.

FIG. 6A shows that the rightmost part of the picture is elongated. That is, the vertical pixel line at the rightmost position of the image actually effective in the frame is copied and added to right side to form a plurality of vertical lines as the padding data. On the other hand, in FIG. 6B, no padding data is displayed (instead, the image having the same color as the background color is displayed), and thus fine display is achieved without any unrelated image part.

In the example of the above embodiment, the content inputted into this device is WMV content obtained by transcoding DVD content. However, when the content to be inputted meets the conditions such as 480×852 and 16:9 without particularly requiring transcoding, the content can be inputted into this device regardless of its codec type and file format. In other words, requirements for the content whose display area can be set in Step S15 are as follows: having information concerning vertical and horizontal frame sizes and aspect ratio; not having a display area specification; and realizing that the difference in size calculated in Step S14 becomes 16 or smaller.

Further, in the above embodiment, the padding data is added in the horizontal direction, but the padding data may be added in the vertical direction, depending on the content. In this case, calculation in terms of the vertical direction should be performed in the above Step S14. That is, if the difference between the value obtained by multiplying the horizontal size by the aspect ratio (here, vertical size/horizontal size) and the horizontal frame size is 16 or smaller, the value calculated by multiplying the horizontal size by the aspect ratio (=vertical size/horizontal size) can be set as the size in the vertical direction. For example, a range of the calculated value from the upper end or the lower end of the frame can be set as the display range in the vertical direction.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

The invention claimed is:

1. A content reproducing device comprising:
a content acquisition unit configured to read content from a recording medium, the content including at least, (a) an image signal of an image frame defined by a first direction and a second direction perpendicular to the first direction, (b) a first size and a second size respectively showing sizes in the first direction and the second direction of the image frame, and (c) information on a predetermined aspect ratio;
a display area determination unit configured to calculate a third size by multiplying the first size by the predetermined aspect ratio and determine, as a display area of the image frame, an area defined by (i) an entire range in the image frame in the first direction and a range of length of the third size in the second direction from a predetermined position in the image frame when a difference between the third size and the second size is a predetermined value or smaller and (ii) an entire area of the image frame when the difference is larger than the predetermined value; and
a reproduction controller configured to perform control so that the display area of the image frame is displayed and a part other than the display area in the image frame is not displayed.

2. The device of claim 1, wherein the predetermined value is sixteen.

3. The device of claim 1, wherein the predetermined position is one of both ends of an entire range in the second direction in the image frame.

4. The device of claim 1, wherein the reproduction controller performs control so that a black image is displayed in the part other than the display area in the image frame.

5. The device of claim 1, wherein the reproduction controller displays the image frame in a window, and hides the part other than the display area in the image frame by making the window smaller.

6. The device of claim 1, wherein the first direction is a vertical direction while the second direction is a horizontal direction, or the first direction is the horizontal direction while the second direction is the vertical direction.

7. A content reproducing method comprising:
reading content from a recording medium, the content including at least, (a) an image signal of an image frame defined by a first direction and a second direction perpendicular to the first direction, (b) a first size and a second size respectively showing sizes in the first direction and the second direction of the image frame, and (c) information on a predetermined aspect ratio;
calculating a third size by multiplying the first size by the predetermined aspect ratio and determining, as a display area of the image frame, an area defined by (i) an entire range in the image frame in the first direction and a range of length of the third size in the second direction from a predetermined position in the image frame when a difference between the third size and the second size is a predetermined value or smaller and (ii) an entire area of the image frame when the difference is larger than the predetermined value; and performing control so that the display area of the image frame is displayed and a part other than the display area in the image frame is not displayed.

8. The method of claim 7, wherein the predetermined value is sixteen.

9. The method of claim 7, wherein the predetermined position is one of both ends of an entire range in the second direction in the image frame.

10. The method of claim 7, wherein a black image is displayed in the part other than the display area in the image frame.

11. The method of claim 7, wherein the image frame is displayed in a window, and the part other than the display area in the image frame is hidden by the window being made smaller.

12. The method of claim 7, wherein the first direction is a vertical direction while the second direction is a horizontal direction, or the first direction is the horizontal direction while the second direction is the vertical direction.

13. A non-transitory computer readable medium storing a program which, when executed by a computer, causes the computer to perform steps comprising:

reading content from a recording medium, the content including at least, (a) an image signal of an image frame defined by a first direction and a second direction perpendicular to the first direction, (b) a first size and a second size respectively showing sizes in the first direction and the second direction of the image frame, and (c) information on a predetermined aspect ratio;

calculating a third size by multiplying the first size by the predetermined aspect ratio and determining, as a display area of the image frame, an area defined by (i) an entire range in the image frame in the first direction and a range of length of the third size in the second direction from a predetermined position in the image frame when a difference between the third size and the second size is a predetermined value or smaller and (ii) an entire area of the image frame when the difference is larger than the predetermined value; and performing control so that the display area of the image frame is displayed and a part other than the display area in the image frame is not displayed.

14. The medium of claim 13, wherein the predetermined value is sixteen.

15. The medium of claim 13, wherein the predetermined position is one of both ends of an entire range in the second direction in the image frame.

16. The medium of claim 13, wherein a black image is displayed in the part other than the display area in the image frame.

17. The medium of claim 13, wherein the image frame is displayed in a window, and the part other than the display area in the image frame is hidden by the window being made smaller.

* * * * *